Nov. 9, 1971　　　　　B. MYERS　　　　3,618,254
FISHING DEVICE
Filed May 1, 1970
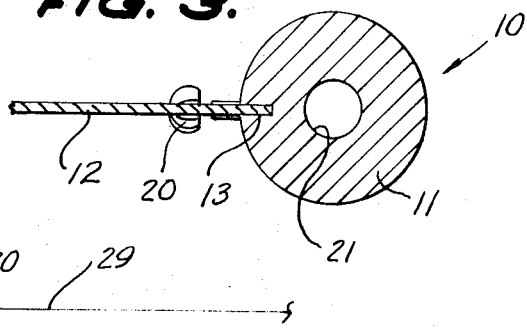
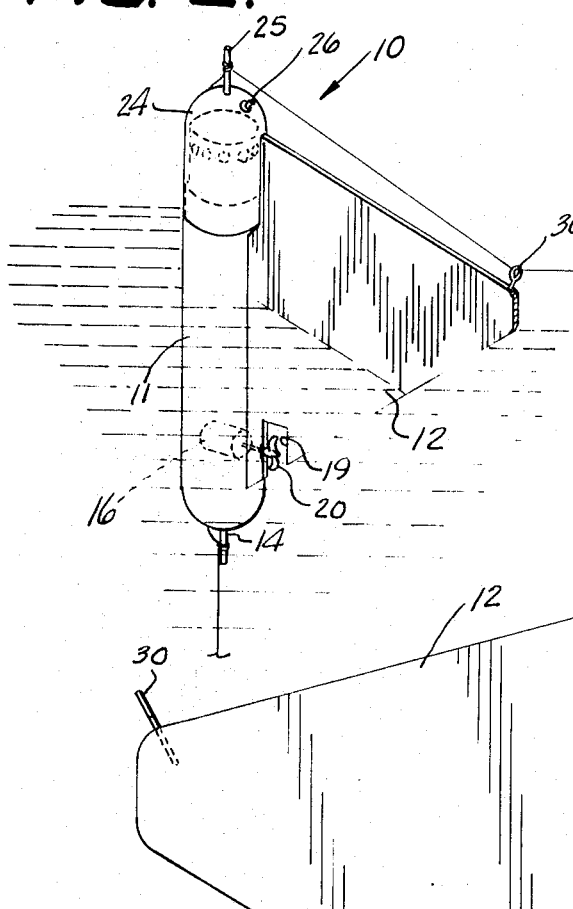
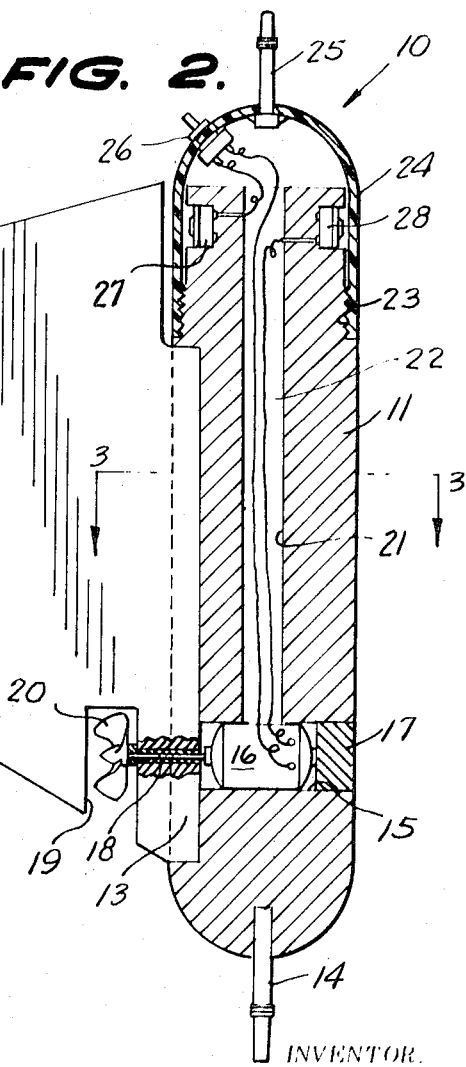
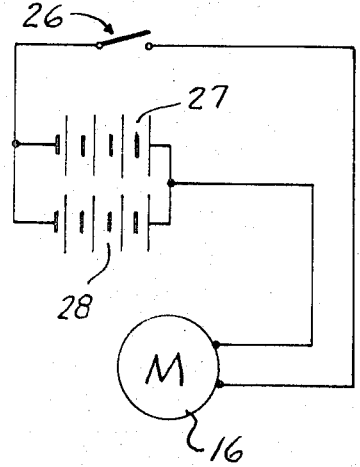
INVENTOR.
BRUCE MYERS,
BY
Berman, Davidson & Berman
ATTORNEYS 3,618,254
FISHING DEVICE
Bruce Myers, 2400 Magnolia, South Daytona, Fla. 32021
Filed May 1, 1970, Ser. No. 33,658
Int. Cl. A01k 97/00
U.S. Cl. 43—26.1                                    5 Claims

ABSTRACT OF THE DISCLOSURE

A fishing device in which a float is provided with a motor-driven propeller with power being supplied to the propeller by solar cells. A sail is secured to the fishing device to provide steerability and for offsetting the wind effect on the device. The fishing device supports a fish line with hooks, lures and the like and maintains the line at the desired fishing location.

BACKGROUND OF THE INVENTION

Field of the invention

The present invention relates to supports for fishing lines and particularly to supports which are motor propelled to reach and remain at the desired position.

SUMMARY OF THE INVENTION

The present invention includes an upright floatable body having a motor-driven propeller mounted in its lower end and electric energy-supplying solar cells mounted in its upper end for powering the electric motor. The device supports a fishing line and has a sail secured thereto for stabilizing and steering the device.

The primary object of the invention is to provide a fishing device which will maintain a fishing line at a desired position through the use of solar cell supplied energy.

Other objects and advantages will become apparent in the following specification when considered in the light of the attached drawings.

BRIEF DESCRIPTION OF THE DRAWINGS

FIG. 1 is a perspective view of the invention;

FIG. 2 is a vertical sectional view of the invention;

FIG. 3 is a horizontal section taken along the line 3—3 of FIG. 2 looking in the direction of the arrows partially broken away for convenience of illustration; and FIG. 4 is a wiring diagram of the circuits used with the invention.

DESCRIPTION OF THE PREFERRED EMBODIMENT

Referring now to the drawings in detail wherein like reference characters indicate like parts throughout the several figures, the reference numeral 10 indicates generally a fishing device constructed in accordance with the invention.

The fishing device 10 includes a generally cylindrical upright body 11 formed of balsa wood or any other rigid floatable material. The body 11 has a flat generally triangular sail 12 secured thereto with an upright edge portion 13 of the sail 12 embedded in the body 11.

A rod 14 is embedded in the body 11 at the lower end thereof and extends downwardly therefrom axially of the body 11.

A transverse bore 15 extends across the body 11 adjacent the lower end thereof and has a light-weight electric motor 16 mounted therein. A plug 17 closes the open end of the bore 15 as can be seen in FIG. 2. A shaft 18 extends from the motor 16 terminating in a rectangular opening 19 of the lower edge of the sail 12. The shaft 18 carries a propeller 20 on its outer end with the propeller 20 being turned by the motor 16 when energized.

An axial bore 21 extends upwardly from the bore 15 to the upper end of the body 11 to permit electric wires 22 to extend from the motor 16 upwardly in the body 11.

The upper end of the body 11 is externally threaded at 23 to receive a transparent plastic dome cap 24 adapted to engage thereover as can be seen in FIG. 2. A rod 25 is mounted in the transparent cap 24 and extends upwardly therefrom in axial alignment with the rod 14. An electric switch 26 is mounted in the cap 24 for reasons to be assigned. A solar cell unit 27 is mounted in the upper end of the body 11 and covered by the cap 24. A second solar cell unit 28 is mounted on the opposite side of the body 11 and is likewise covered by the cap 24. The solar cell units 27, 28 are wired in parallel to the motor 16 and are controlled by the hand control switch 26 in order to actuate the motor 16.

A fishing line 29 extends from a conventional fishing pole (not shown) through an eye 30 mounted on the outer end of the upper edge of the sail 12 and is wound about the rod 25. The fishing line 29 then extends downwardly alongside of the body 11 and is wound around the rod 14 before extending to the hook, lure or other fishing device on its lower end (not shown).

In the use and operation of the invention, the fishing device 10 is placed in the water after the switch 26 has been turned on and the propeller 20 will push the device outwardly away from the fishermen under the guidance of the sail 12 and the fishing line 29. In the event that wind or current cause the device to move to an undesired position the sail 12 can be adjusted by bending it with respect to the body 11 to cause the device to move to the desired spot.

The solar cells 27, 28 are manufactured by Herbach and Rabeman, Inc. of 1204 Arch Street, Philadelphia, Pa., as described under their catalog No. TM13K490. The electric motor is also of conventional design.

Having thus described the preferred embodiment of the invention it should be understood that numerous structural modifications and adaptations may be resorted to without departing from the spirit of the invention.

What is claimed is:

1. A fishing device comprising a generally cylindrical upright body formed of floatable material, a sail secured to said body and extending outwardly therefrom, an electric motor mounted in said body adjacent the lower end thereof, a shaft extending laterally of said body from said electric motor, a propeller mounted on the outer end of said shaft adjacent said body, solar cells mounted in the upper end of said body and electrically connected to said motor, and a transparent cover enclosing said solar cells and detachably connected to the upper end of said body.

2. A device as claimed in claim 1 wherein means are provided on said body and said sail for securing a fish line thereto.

3. A device as claimed in claim 1 wherein said sail is flat and of generally triangular configuration.

4. A device as claimed in claim 1 wherein a hand controlled switch is provided in the circuit of said electric motor for controlling the flow of electricity from said solar cells to said electric motor.

5. A device as claimed in claim 2 wherein the means for attaching a fish line to said body comprises a rod mounted axially in the lower end of said body and extending downwardly therefrom, a second rod secured to said cap and extending axially upwardly therefrom, and an eye secured to the outer upper edge of said sail.

References Cited

UNITED STATES PATENTS

| | | | |
|---|---|---|---|
| 2,693,047 | 11/1954 | Lumsden | 43—26.1 |
| 2,709,316 | 5/1955 | McCabe | 43—26.1 |
| 2,803,914 | 8/1957 | Ellis | 43—26.1 |
| 2,804,712 | 9/1957 | Jackson | 43—26.1 |
| 3,203,131 | 8/1965 | Myers | 43—26.1 |

SAMUEL KOREN, Primary Examiner

D. J. LEACH, Assistant Examiner

U.S. Cl. X.R.

43—43.13